(No Model.)
T. L. RANKIN.
ICE MACHINE.
No. 270,121. Patented Jan. 2, 1883.
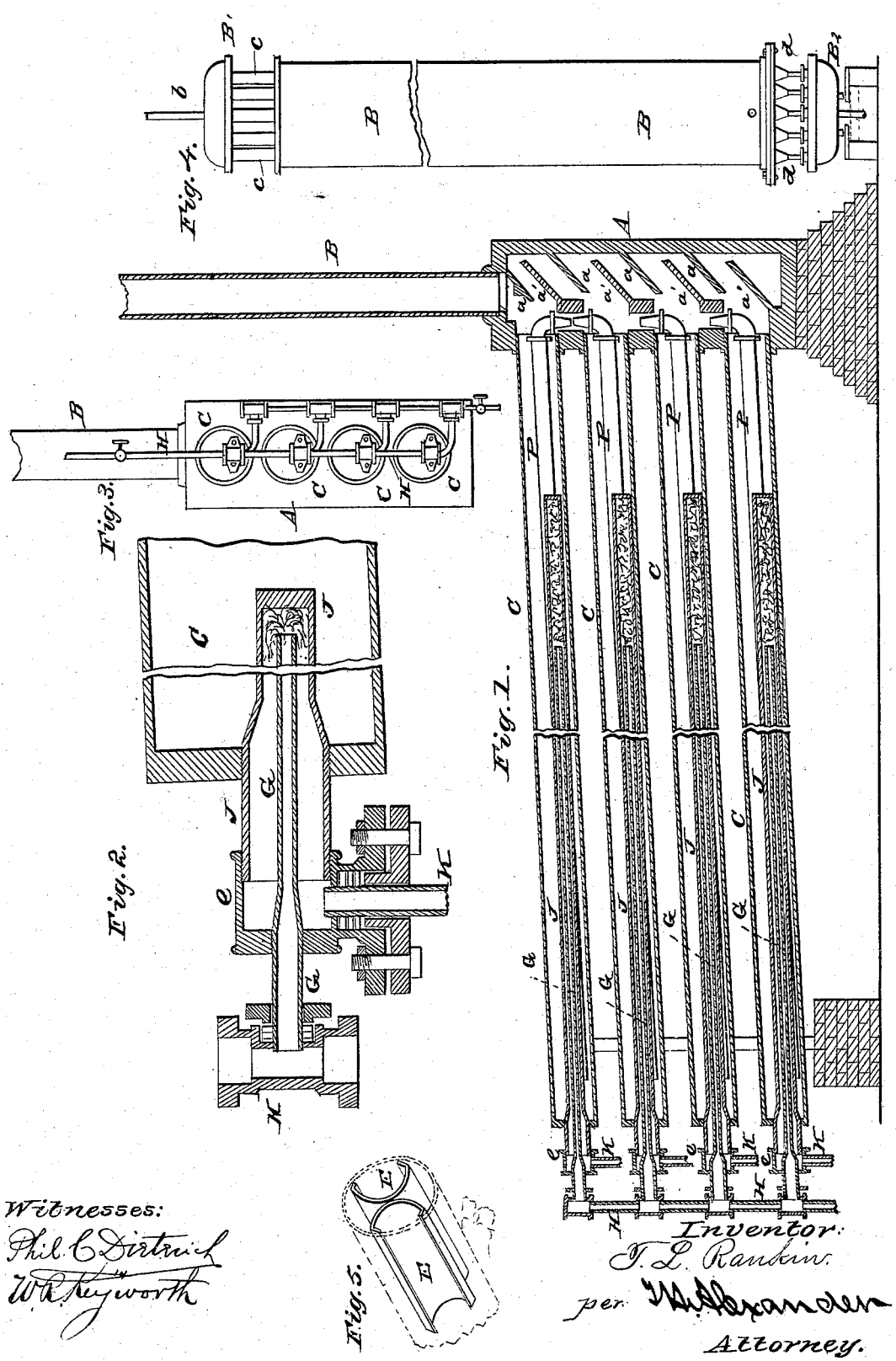

UNITED STATES PATENT OFFICE.

THOMAS L. RANKIN, OF NEW YORK, N. Y.

ICE-MACHINE.

SPECIFICATION forming part of Letters Patent No. 270,121, dated January 2, 1883.

Application filed August 4, 1882. (No model.)

*To all whom it may concern:*

Be it known that I, THOMAS L. RANKIN, of New York, in the county of New York and State of New York, have invented certain new and useful Improvements in Ice-Machines; and I do hereby declare that the following is a full, clear, and exact description thereof, reference being had to the accompanying drawings, and to the letters of reference marked thereon, which form part of this specification, in which—

Figure 1 is a section taken vertically and longitudinally through the improved apparatus for the production of ice. Fig. 2 is an enlarged view, in section and partly broken, of one of the still-pipes, showing the steam-inlet pipe therefor, the connection with the main stand-pipe, and my patented lock-nut stuffing-box joint for the drip-pipe. Fig. 3 is a front view, showing the steam stand-pipe and its connections with the steam and drip pipes. Fig. 4 is a side elevation of an ammonia stand-pipe. Fig. 5 is a perspective view of a double partition adapted for use in the stand-pipe of Fig. 4.

This invention relates to machinery which is designed for making ice by the rapid evaporization of ammonia in still-pipes which are provided with steam-pipes, and with means for rapidly conducting off the water of condensation, as will be fully understood from the annexed drawings and the following description:

A designates a still-chamber, from which rises the ammonia stand-pipe B. Inside of the still-chamber I arrange a number of inclined divisions or shelves, $a$ $a'$, as shown in Fig. 1. These shelves are so arranged that the liqua ammonia, after it leaves the lower end of the stand-pipe B, will flow back and forth through the several inclined still-pipes, C, the gaseous ammonia passing upward over the inclined shelves $a$ and the condensed ammonia passing down the inclined shelves $a'$. The ammonia in a fluid and gaseous form is thus caused to circulate alternately through the still-chamber and through the inclined still-pipes C.

The stand-pipe B is preferably of cylindrical form, and inside of this pipe I apply concavo-convex partitions E, arranged back to back, as shown in Fig. 5. The top or head B' of the stand-pipe B is a shallow chamber, into the center of the upper end of which leads a feed-pipe, $b$. This hollow head communicates with the upper end of the stand-pipe by means of several pipes, $c$.

At the lower end of the stand-pipe B are several funnel-shaped pipes, $d$, which communicate with a foot or base chamber, $B^2$, constructed substantially like the chamber B', and from the said base chamber the ammonia flows into the highest part of the still-chamber A.

I will now describe my new system of pipes for the use of steam in causing a rapid vaporization of the liqua ammonia in the still-pipes C. G G G G designate steam-inlet pipes, which are connected by suitable couplings to a common stand-pipe, H, that communicates with a steam-generator. The steam-pipes G enter the heads of return-pipes J, and are therein contracted, and these return-pipes enter the heads of the still-pipes C, and are also contracted, as shown in Figs. 1 and 2. The return-pipes J extend nearly to the highest ends of the still-pipes, and the steam-inlet pipes extend nearly to the highest closed ends of the return-pipes. The steam is by the above means conducted upward inside of the still-pipes, and is then caused to return through the pipes J, outside of the steam-pipes, to the lower ends thereof, and, with the water of condensation, is discharged through the branch pipes $e$ into a common vertical drip-pipe, K.

The joints of the several pipes may be made as I have shown, or in any other suitable manner whereby the ammoniacal gas is not allowed to escape.

The liqua ammonia, as it leaves the inclined partitions $a$, flows through pipes P, and is discharged therefrom near the lower ends of the still-pipes and flows backward. At the same time the ammonia is gasified rapidly by the heat of the steam sent through the inlet and return pipes above described.

Having described my invention, I claim—

1. The combination, with the still-chamber having inclined partitions or shelves, of the inclined still-pipes, the ammonia-conducting pipes, the steam-inlet pipes, and the return-pipes, constructed and arranged to operate substantially in the manner and for the purposes described.

2. The combination of the still-chamber, its inclined shelves, a stand-pipe, B, the inclined still-pipes containing inlet and return steam-pipes, the vertical pipe K, and branch pipes leading into a common drip-pipe, constructed and arranged to operate substantially in the manner and for the purposes described.

3. The combination of the vertical stand-pipe, condenser B, the concavo-convex partitions therein, the still-chamber, and the inclined still-pipes provided with steam heating-pipes, all constructed and arranged to operate substantially in the manner and for the purposes described.

4. The condensing stand-pipe B, having double convex partitions, head and base chambers, and pipes connecting these chambers with the ends of said pipe B, substantially in the manner and for the purposes described.

In testimony that I claim the foregoing as my own I affix my signature in presence of two witnesses.

THOS. L. RANKIN.

Witnesses:
T. H. ALEXANDER,
R. T. CAMPBELL.